(12) United States Patent
Wang

(10) Patent No.: US 8,651,818 B2
(45) Date of Patent: *Feb. 18, 2014

(54) LOCKING DEVICE

(75) Inventor: Xiongcheng Wang, Zhongshan (CN)

(73) Assignee: Zhongshan Broad-Ocean Motor Co., Ltd., Zhongshan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/343,696

(22) Filed: Jan. 4, 2012

(65) Prior Publication Data

US 2012/0114502 A1    May 10, 2012

Related U.S. Application Data

(63) Continuation of application No. PCT/CN2010/077251, filed on Sep. 25, 2010.

(30) Foreign Application Priority Data

Mar. 31, 2010 (CN) .................. 2010 2 0152163 U

(51) Int. Cl.
  *F04D 29/34* (2006.01)
  *F04D 29/52* (2006.01)
(52) U.S. Cl.
  USPC ................................ 416/204 R; 416/244 R

(58) Field of Classification Search
  USPC .......... 416/244 R, 204 R, 205, 248; 403/256, 403/338, 339–340, 364, 381
  See application file for complete search history.

(56) References Cited

U.S. PATENT DOCUMENTS

| | | | | |
|---|---|---|---|---|
| 5,558,369 A | * | 9/1996 | Cornea et al. | 280/800 |
| 5,611,668 A | * | 3/1997 | Yapp et al. | 416/189 |
| 7,182,574 B2 | * | 2/2007 | Lyons | 415/213.1 |

\* cited by examiner

*Primary Examiner* — Nathaniel Wiehe
*Assistant Examiner* — Woody A Lee, Jr.
(74) *Attorney, Agent, or Firm* — Matthias Scholl P.C.; Matthias Scholl

(57) ABSTRACT

A locking device including a hoop, the hoop curling up to form an axial mounting hole in the middle. An upper convex block, a lower convex block, a middle aperture, a left aperture, a right aperture, an upper convex ear, a lower convex ear, an upper guiding inclined plane, and a lower guiding inclined plane are disposed in the device. The upper convex block and the lower convex block move axially to narrow the middle aperture, the upper guiding inclined plane and the lower guiding inclined plane contact with each other to make the upper convex block and the lower convex block to move circumferentially to narrow both the left aperture and the right aperture and enable the hoop to tightly hold objects inside the axial mounting hole. The locking device has a simple structure, low cost, robust connecting structure, convenient and efficient assembly and disassembly processes.

20 Claims, 17 Drawing Sheets

LOCKING DEVICE

CROSS-REFERENCE TO RELATED APPLICATIONS

This application is a continuation of International Patent Application No. PCT/CN2010/077251 with an international filing date of Sep. 25, 2010, designating the United States, now pending, and further claims priority benefits to Chinese Patent Application No. 201020152163.9 filed Mar. 31, 2010. The contents of all of the aforementioned applications, including any intervening amendments thereto, are incorporated herein by reference.

BACKGROUND OF THE INVENTION

1. Field of the Invention

The invention relates to a locking device.

2. Description of the Related Art

Conventional locking devices include a hoop and a mounting hole formed in the middle thereof. Particularly, for an external rotor axial flow fan, as shown in FIG. 17, the hoop is connected using blades. All side installation sections of the hoop are all arranged with radial mounting holes. The installation sections are radially connected using external bolts and nuts to circumferentially tighten the rotor of the external rotor motor of the axial flow fan. In the process of assembly and disassembly, as the bolts are mounted close to the fan blades, the installation spaces are severely limited, thereby leading to inconvenient and inefficient assembly and disassembly.

SUMMARY OF THE INVENTION

In view of the above-described problems, it is one objective of the invention to provide a locking device that has a simple structure, low cost, robust connecting structure, convenient and efficient assembly and disassembly processes.

To achieve the above objective, in accordance with one embodiment of the invention, there is provided a locking device comprising a hoop, the hoop curling up to form an axial mounting hole in the middle, wherein an upper convex block protrudes from a left side end of the hoop while a lower convex block protrudes from a right side end of the hoop; the upper convex block and the lower convex block are misaligned to form a middle aperture; a left aperture is formed between the hoop's left side end and the lower convex block, a right aperture is formed between the hoop's right side end and the upper convex block; an upper convex ear protrudes from the outer side of the upper convex block and a lower convex ear protrudes from the outer side of the lower convex block; the upper convex ear corresponds to the lower convex ear with respect to their positions; the upper convex block and the lower convex block are respectively arranged with an upper guiding inclined plane and a lower guiding inclined plane; the upper convex ear comprises a through hole, and the lower convex ear comprises a mounting hole; the through hole of the upper convex ear and the mounting hole of the lower convex ear are axially connected using a bolt-nut mechanism or screws to lock the upper convex ear and the lower convex ear; the upper convex block and the lower convex block move axially to narrow the middle aperture, the upper guiding inclined plane and the lower guiding inclined plane contact with each other to make the upper convex block and the lower convex block to move circumferentially to narrow both the left aperture and the right aperture and enable the hoop to tightly hold an object inside the axial mounting hole.

In a class of this embodiment, the upper guiding inclined plane and the lower guiding inclined plane are directly arranged on the opposite end of the upper convex block and the lower convex block, or respectively arranged on an upper inclined plate and a lower inclined plate extending from the upper convex block and the lower convex block.

In a class of this embodiment, the upper convex ear is respectively arranged at both ends of the upper inclined plate, the lower convex ear is respectively arranged at both ends of the lower inclined plate, and the upper convex ear corresponds to the lower convex ear with respect to their positions.

In a class of this embodiment, the upper convex ear is arranged at one end of the upper inclined plate, the lower convex ear is arranged at one end of the lower inclined plate, and the upper convex ear corresponds to the lower convex ear with respect to their positions.

In a class of this embodiment, both the through hole of the upper convex ear and the mounting hole of the lower convex ear have a circular or a waist shape.

Fan blades are connected to the outer wall of the hoop.

In a class of this embodiment, the object inside the axial mounting hole is either an external rotor of a motor or a motor shaft.

Advantages of the invention are summarized below. The upper convex block protrudes from the left side end of the hoop while the lower convex block protrudes from the right side end of the hoop; the upper convex block and the lower convex block are misaligned to form the middle aperture, the left aperture is formed between the hoop's left side end and the lower convex block, the right aperture is formed between the hoop's right side end and the upper convex block; the upper convex ear protrudes from the outer side of the upper convex block and the lower convex ear protrudes from the outer side of the lower convex block; the upper convex ear corresponds to the lower convex ear with respect to their positions; the upper convex block and the lower convex block are respectively arranged with the upper guiding inclined plane and the lower guiding inclined plane; the bolt-nut mechanism or screws are used to axially connect the through hole of the upper convex ear and the mounting hole of the lower convex ear so as to lock the upper convex ear and the lower convex ear. The above structure is characterized in that it has a simple installation structure, low cost, robust connecting structure, big axial locking space, and convenient and efficient assembly and disassembly processes, and during assembly and disassembly processes, it is unlikely to be affected by the fan blades.

DETAILED DESCRIPTION OF THE EMBODIMENTS

The invention is explained in further detail below with the aid of the example embodiments and attached drawings.

Example 1

Figure 1:
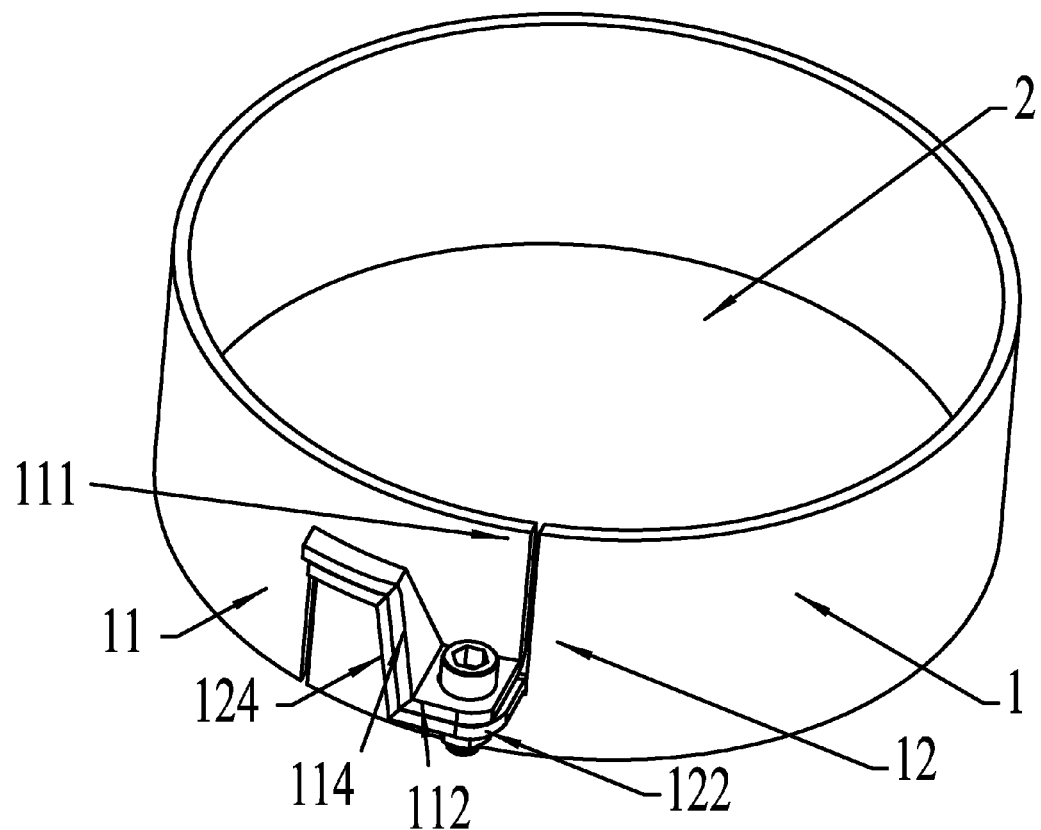
FIG. 1 is a three-dimensional structural view of a locking device according to one embodiment of the invention.
Figure 2:
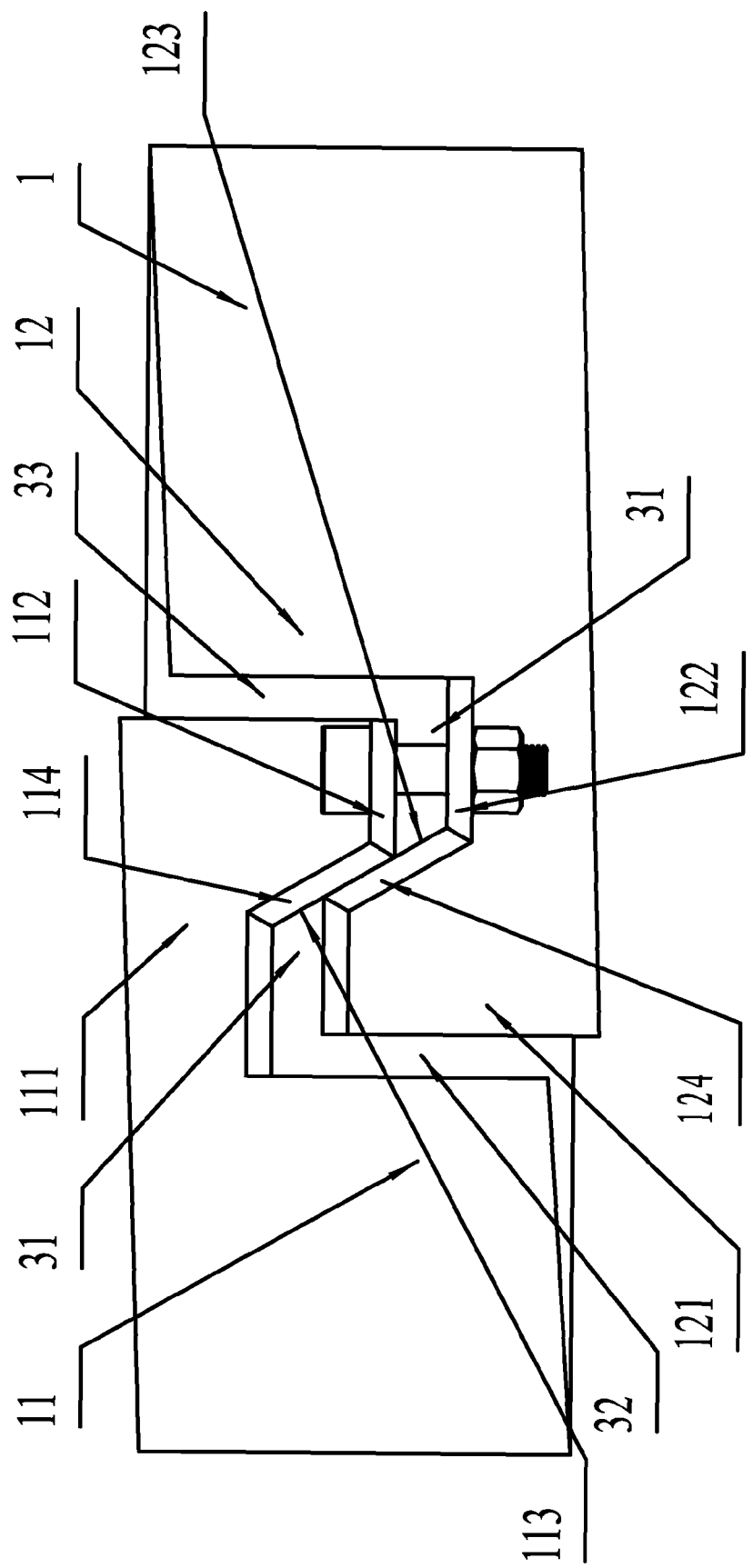
FIG. 2 is a schematic plan view of a locking device of FIG. 1 before installation and locking.
Figure 3:
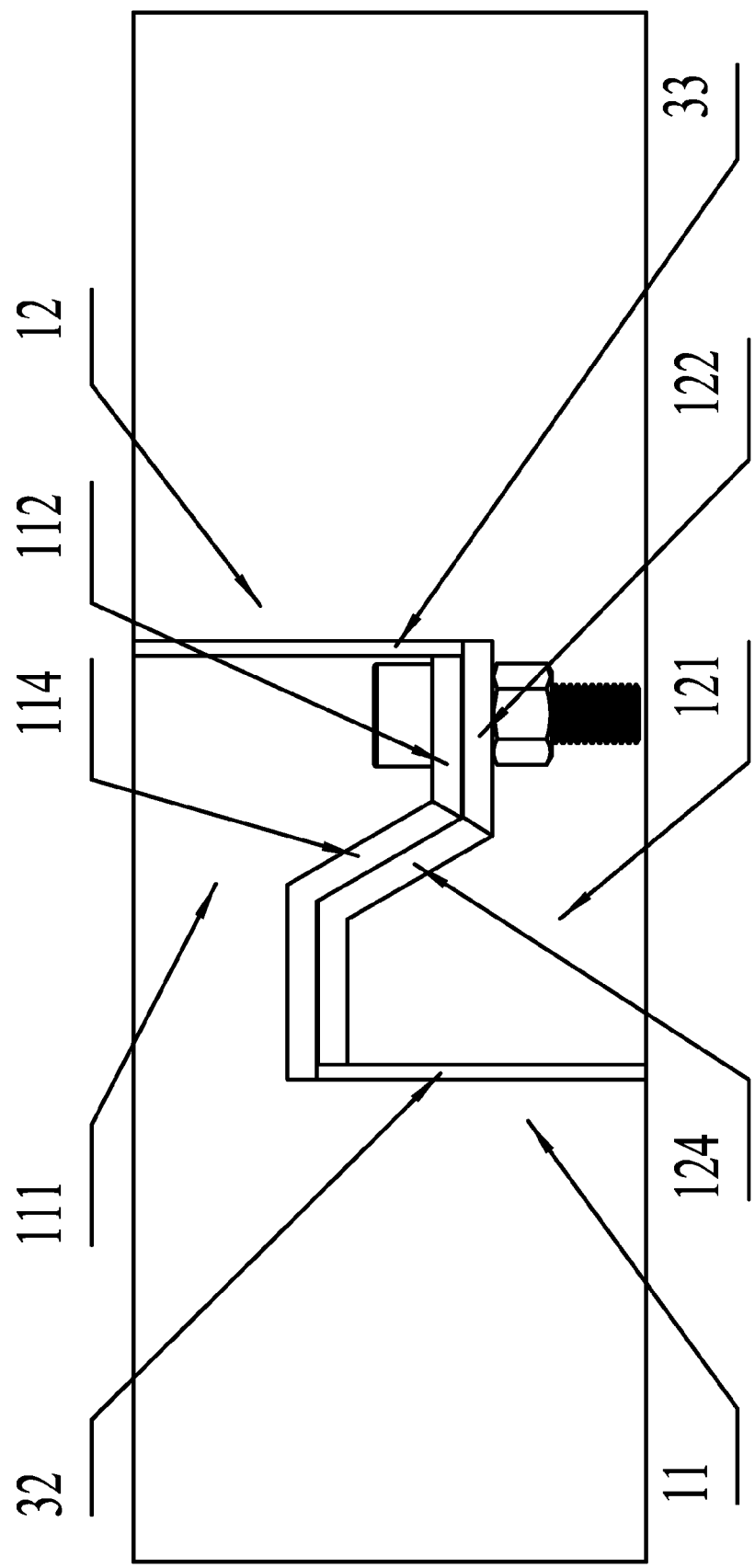
FIG. 3 is a schematic plan view of a locking device of FIG. 1 after installation and locking.

As shown in FIGS. 1-3, a locking device comprises a hoop 1. The hoop 1 curls up to form an axial mounting hole 2 in the middle; an upper convex block 111 protrudes from the left side end 11 of the hoop 1 while a lower convex block 121 protrudes from the right side end 12 of the hoop 1; the upper convex block 111 and the lower convex block 121 are misaligned to form a middle aperture 31; a left aperture 32 is formed between the hoop's left side end 11 and the lower convex block 121 and a right aperture 33 is formed between the hoop's right side end 12 and the upper convex block 111; an upper convex ear 112 protrudes from the outer side of the upper convex block 111 and a lower convex ear 122 protrudes from the outer side of the lower convex block 121; the upper convex ear 112 corresponds to the lower convex ear 122 with respect to their positions; the upper convex block 111 and the lower convex block 121 are respectively arranged with an upper guiding inclined plane 113 and a lower guiding inclined plane 123; as shown in FIGS. 10 and 11 or FIGS. 12 and 13, a bolt-nut mechanism or screws are used to axially connect a through hole 115 of the upper convex ear 112 and a mounting hole 125 of the lower convex ear 122 so as to lock the upper convex ear 112 and the lower convex ear 122; the upper convex block 111 and the lower convex block 121 move axially to narrow the middle aperture 31, the upper guiding inclined plane 113 and the lower guiding inclined plane 123 contact with each other to make the upper convex block 111 and the lower convex block 121 to move circumferentially to narrow both the left aperture 32 and the right aperture 33 and enable the hoop 1 to tightly hold the object inside the axial mounting hole 2.

The upper guiding inclined plane 113 and the lower guiding inclined plane 123 are arranged on an upper inclined plate 114 and a lower inclined plate 124 extending through the upper convex block 111 and the lower convex block 121; the upper convex ear 112 is arranged on one or both sides of the upper inclined plate 114 and the lower convex ear 122 is arranged on one or both sides of the lower inclined plate 124, the upper convex ear 112 corresponds to the lower convex ear 122 with respect to their positions; as shown in FIGS. 10-13, both the through hole 115 of the upper convex ear 112 and the mounting hole 125 of the lower convex ear 122 have a circular or a waist shape.

Figure 14:
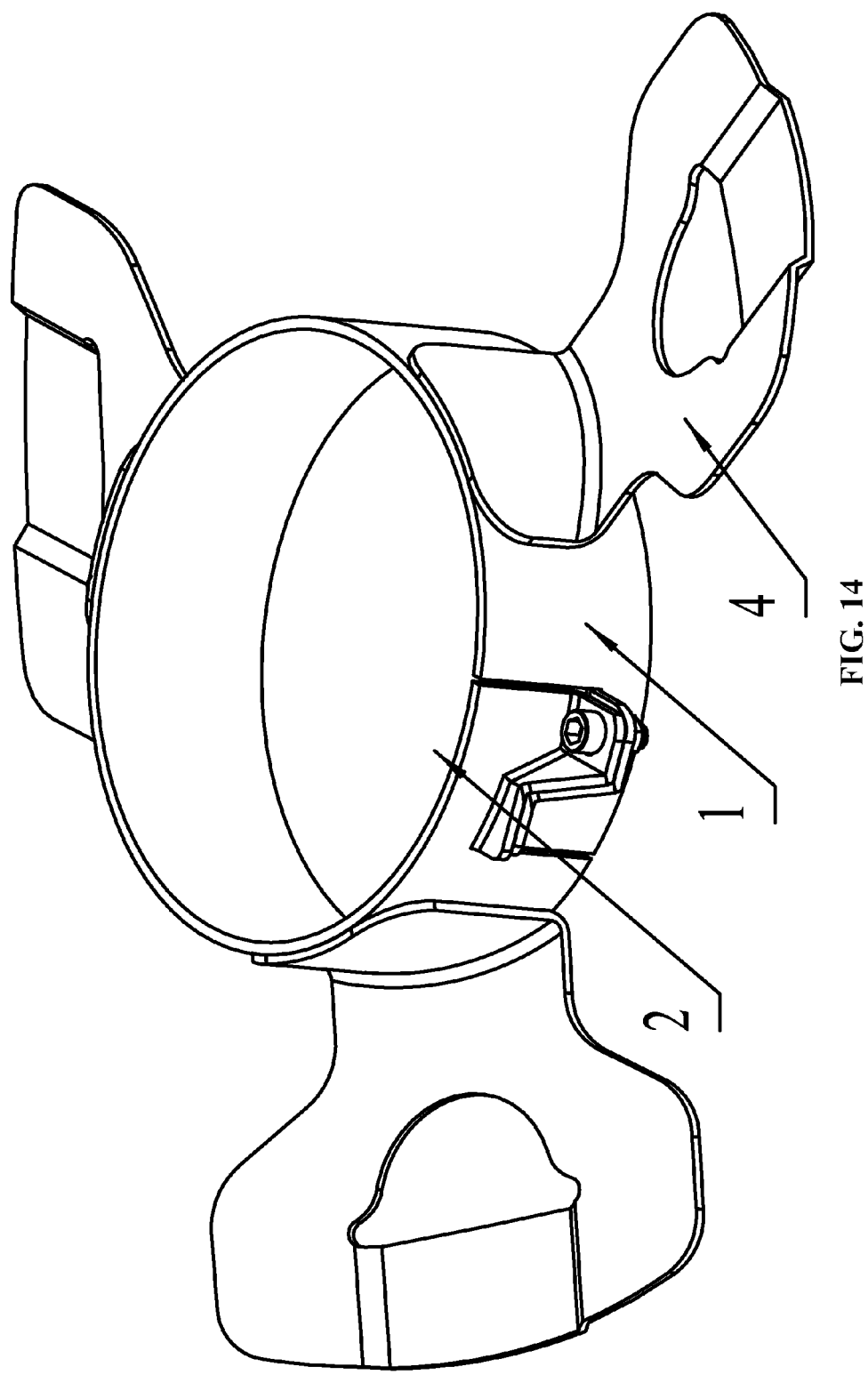
FIG. 14 is a three-dimensional view of a locking device according to one embodiment of the invention mounted with fan blades.
Figure 15:
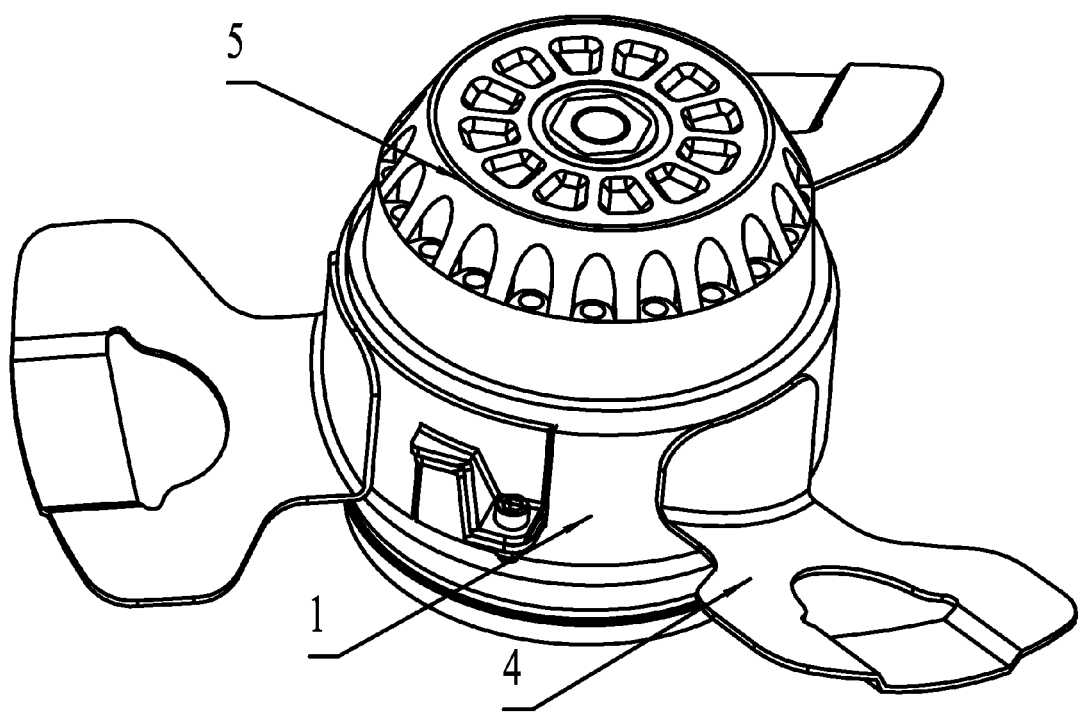
FIG. 15 is a three-dimensional view of a locking device according to one embodiment of the invention applying to an external rotor fan.
Figure 16:
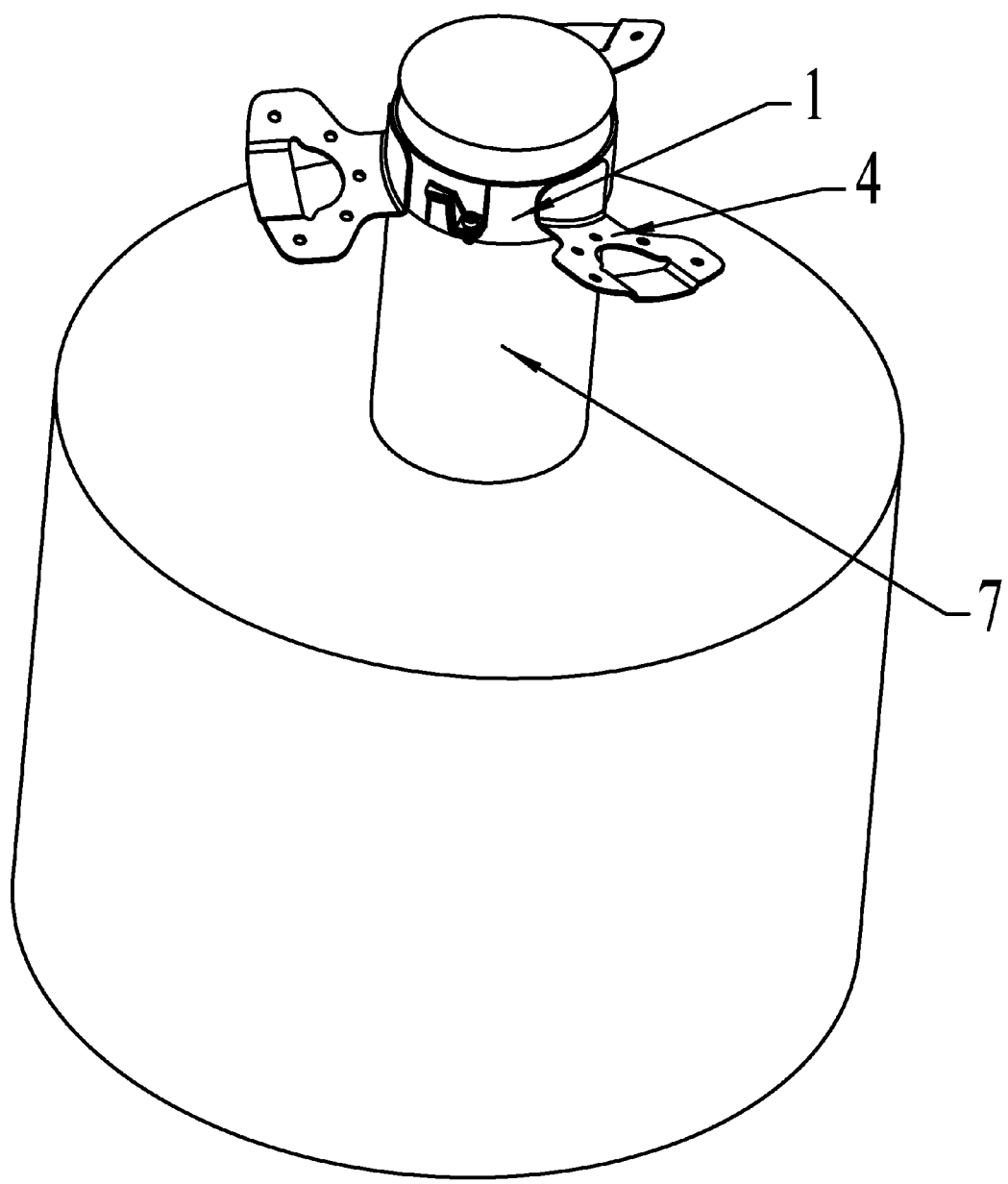
FIG. 16 is a three-dimensional view of a locking device according to one embodiment of the invention applying to a motor shaft.
Figure 17:
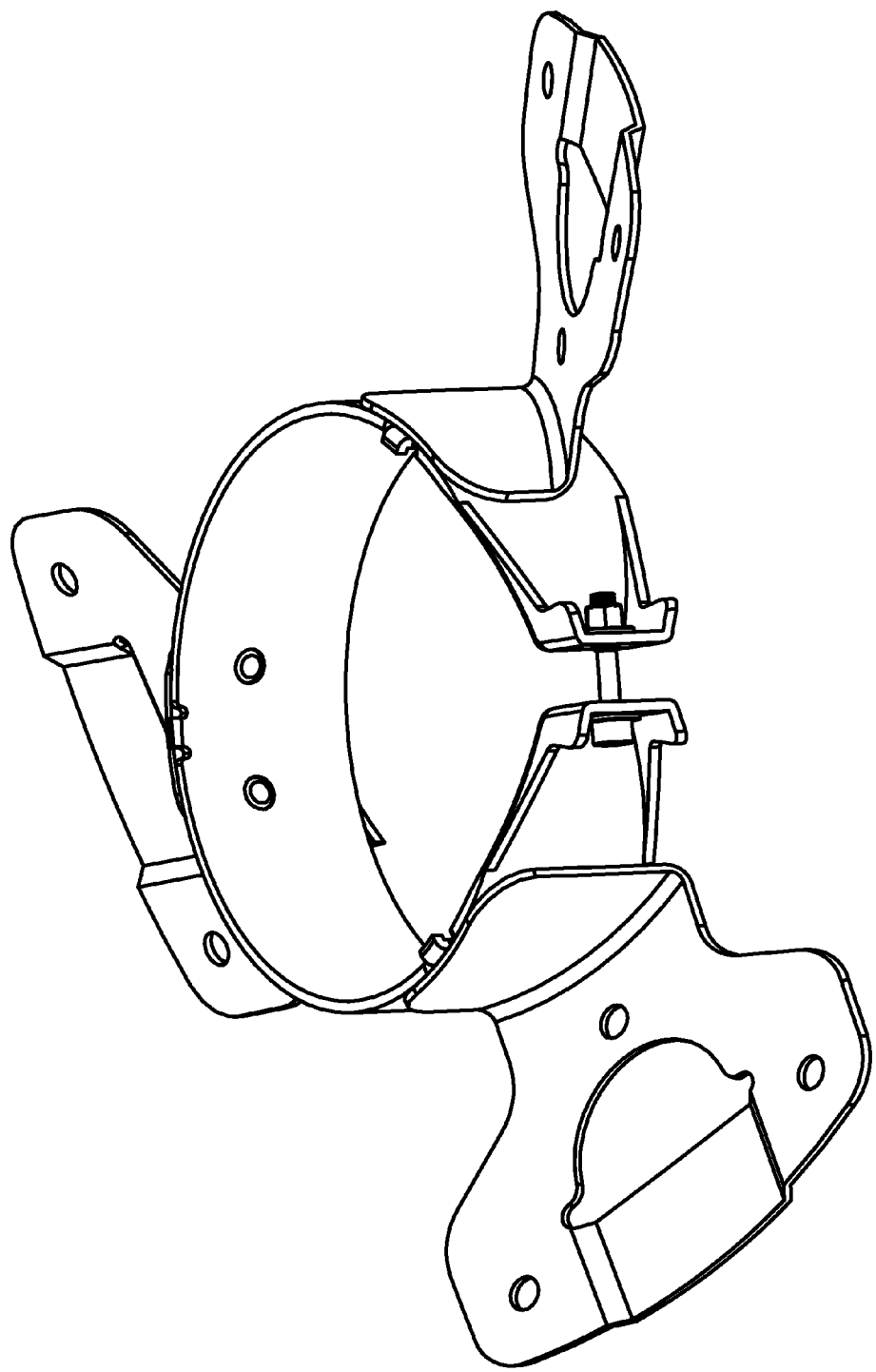
FIG. 17 is a structural view of a conventional locking device applying to an external rotor axial flow fan.

As shown in FIGS. 14-16, a fan blade 4 is coupled to the outer wall of the hoop 1; the object inside the axial mounting hole 2 is either an external rotor 5 of a motor or a motor shaft 7. Certainly the locking device of the invention is also applicable to other fields besides motors.

Example 2

Figure 4:
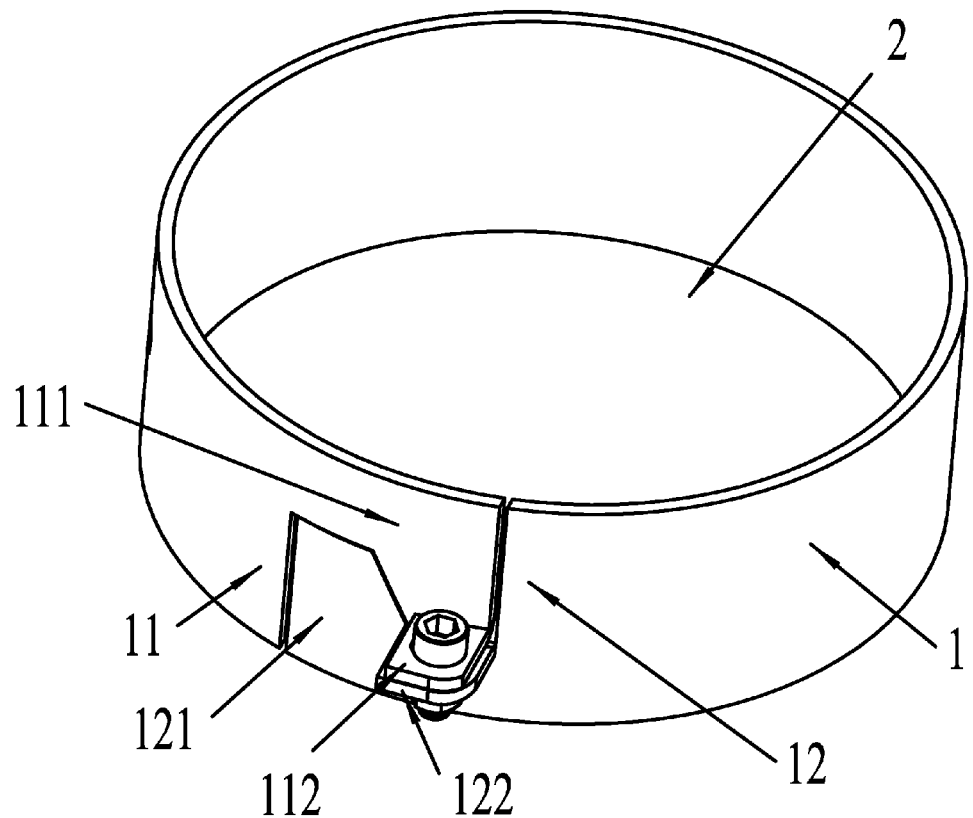
FIG. 4 is a second three-dimensional structural view of a locking device according to one embodiment of the invention.
Figure 5:
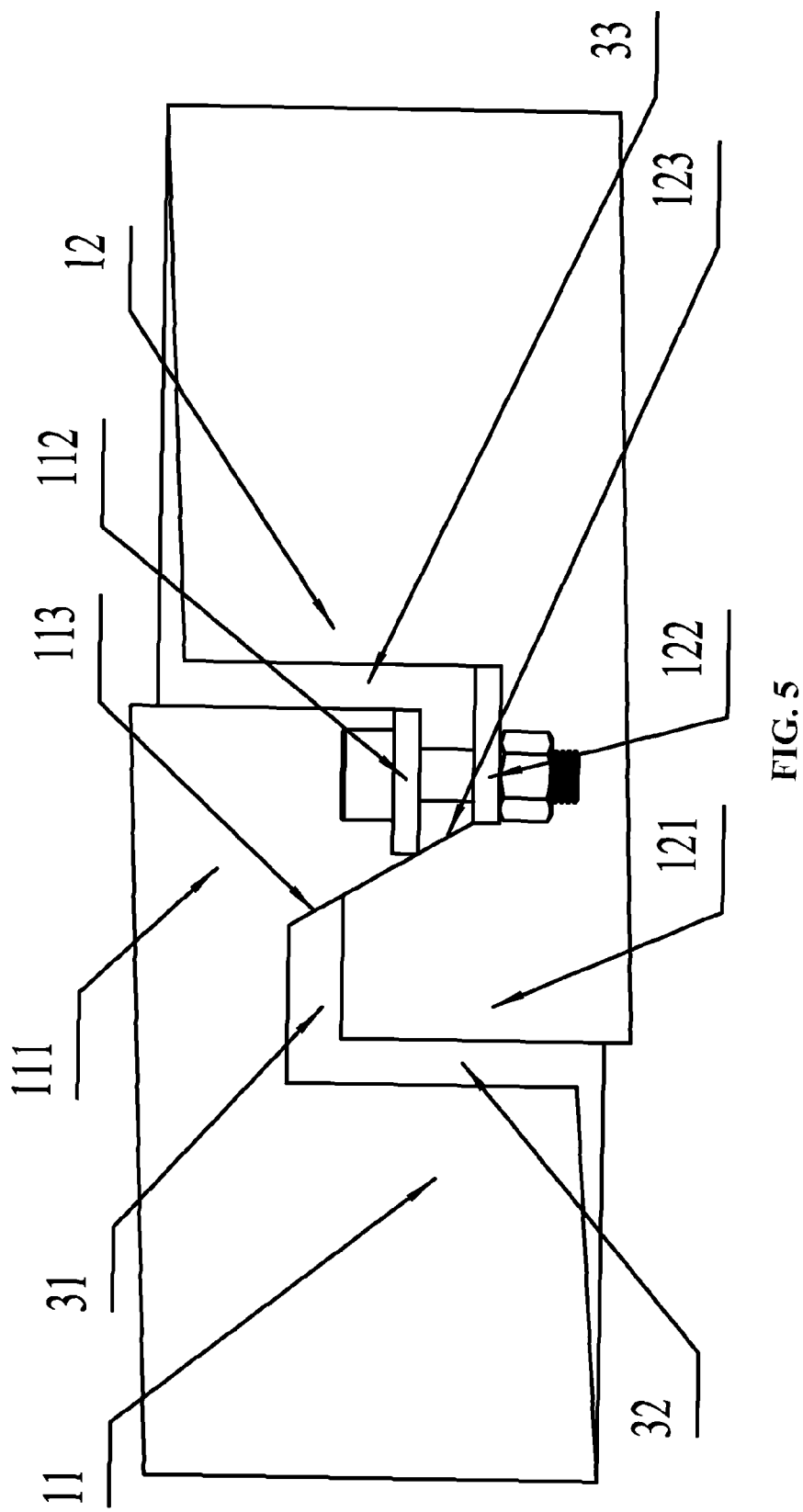
FIG. 5 is a schematic plan view of a locking device of FIG. 4 before installation and locking.
Figure 6:
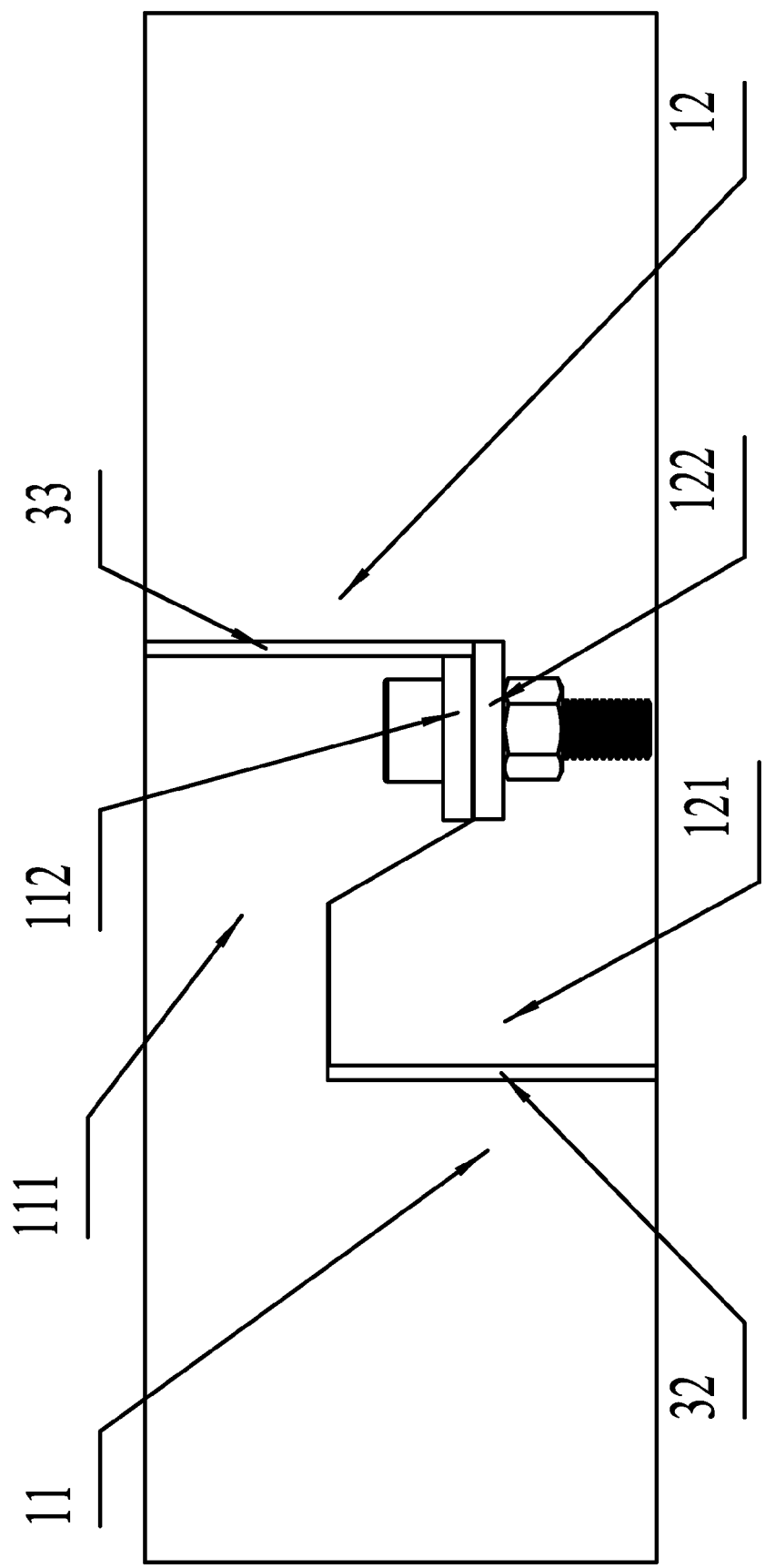
FIG. 6 is a schematic plan view of a locking device of FIG. 4 after installation and locking.

As shown in FIGS. 4-6, a locking device comprises a hoop 1. The hoop 1 curls up to form an axial mounting hole 2 in the middle; an upper convex block 111 protrudes from the left side end 11 of the hoop 1 while a lower convex block 121 protrudes from the right side end 12 of the hoop 1; the upper convex block 111 and the lower convex block 121 are misaligned to form a middle aperture 31; a left aperture 32 is formed between the hoop's left side end 11 and the lower convex block 121 and a right aperture 33 is formed between the hoop's right side end 12 and the upper convex block 111; an upper convex ear 112 protrudes from the outer side of the upper convex block 111 and a lower convex ear 122 protrudes from the outer side of the lower convex block 121; the upper convex ear 112 corresponds to the lower convex ear 122 with respect to their positions; the upper convex block 111 and the lower convex block 121 are respectively arranged with an upper guiding inclined plane 113 and a lower guiding inclined plane 123; as shown in FIGS. 10 and 11 or FIGS. 12 and 13, use a bolt-nut mechanism or screws to axially connect a through hole 115 of the upper convex ear 112 and a mounting hole 125 of the lower convex ear 122 so as to lock the upper convex ear 112 and the lower convex ear 122; the upper convex block 111 and the lower convex block 121 move axially to narrow the middle aperture 31, the upper guiding inclined plane 113 and the lower guiding inclined plane 123 contact with each other to make the upper convex block 111 and the lower convex block 121 to move circumferentially to narrow both the left aperture 32 and the right aperture 33 so as to enable the hoop 1 to tightly hold the object inside the axial mounting hole 2.

The upper guiding inclined plane 113 and the lower guiding inclined plane 123 are directly arranged on the opposite end between the upper convex block 111 and the lower convex block 121, and the upper guiding inclined plane 113 corresponds to the lower guiding inclined plane 123 with respect to their positions; as shown in FIGS. 10-13, both the through hole 115 of the upper convex ear 112 and the mounting hole 125 of the lower convex ear 122 have a circular or a waist shape.

As shown in FIGS. 14-16, a fan blade 4 is coupled to the outer wall of the hoop 1; the object inside the axial mounting hole 2 is either an external rotor 5 of the motor or a motor shaft 7. Certainly the locking device of the present invention is also applicable to other fields besides motors.

Example 3

Figure 7:
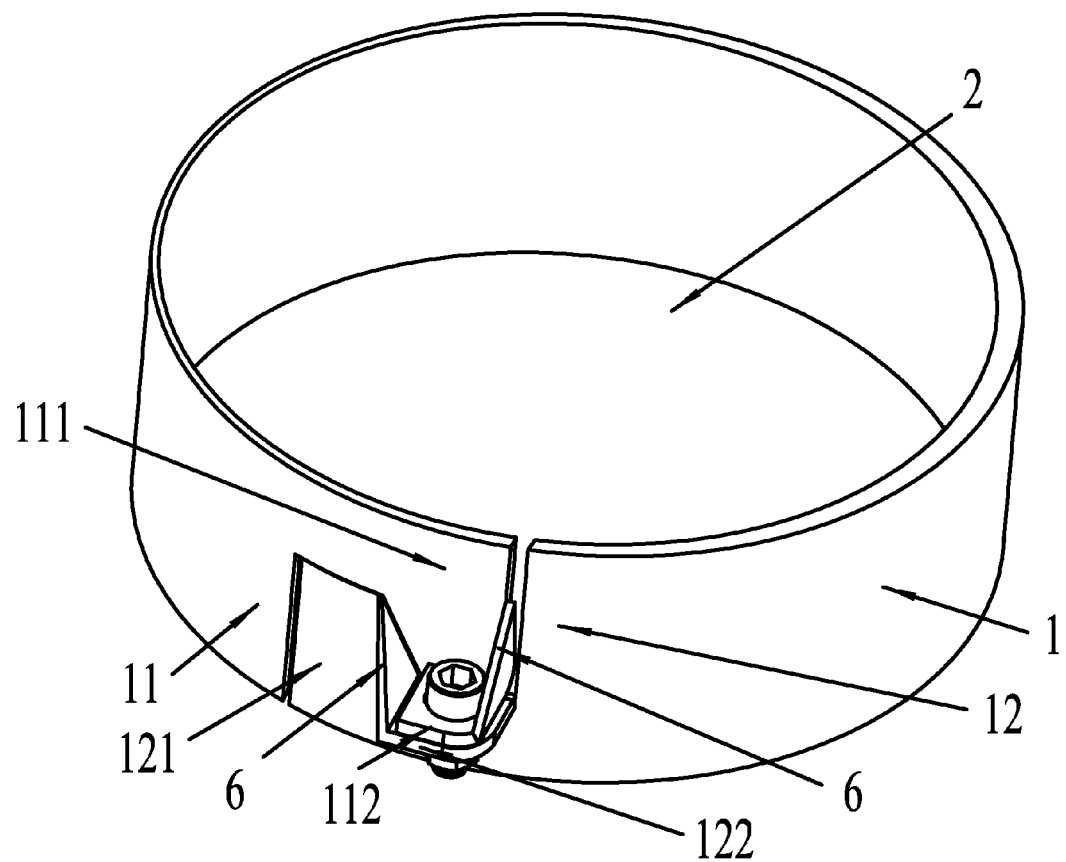
FIG. 7 is a third three-dimensional structural view of a locking device according to one embodiment of the invention.
Figure 8:
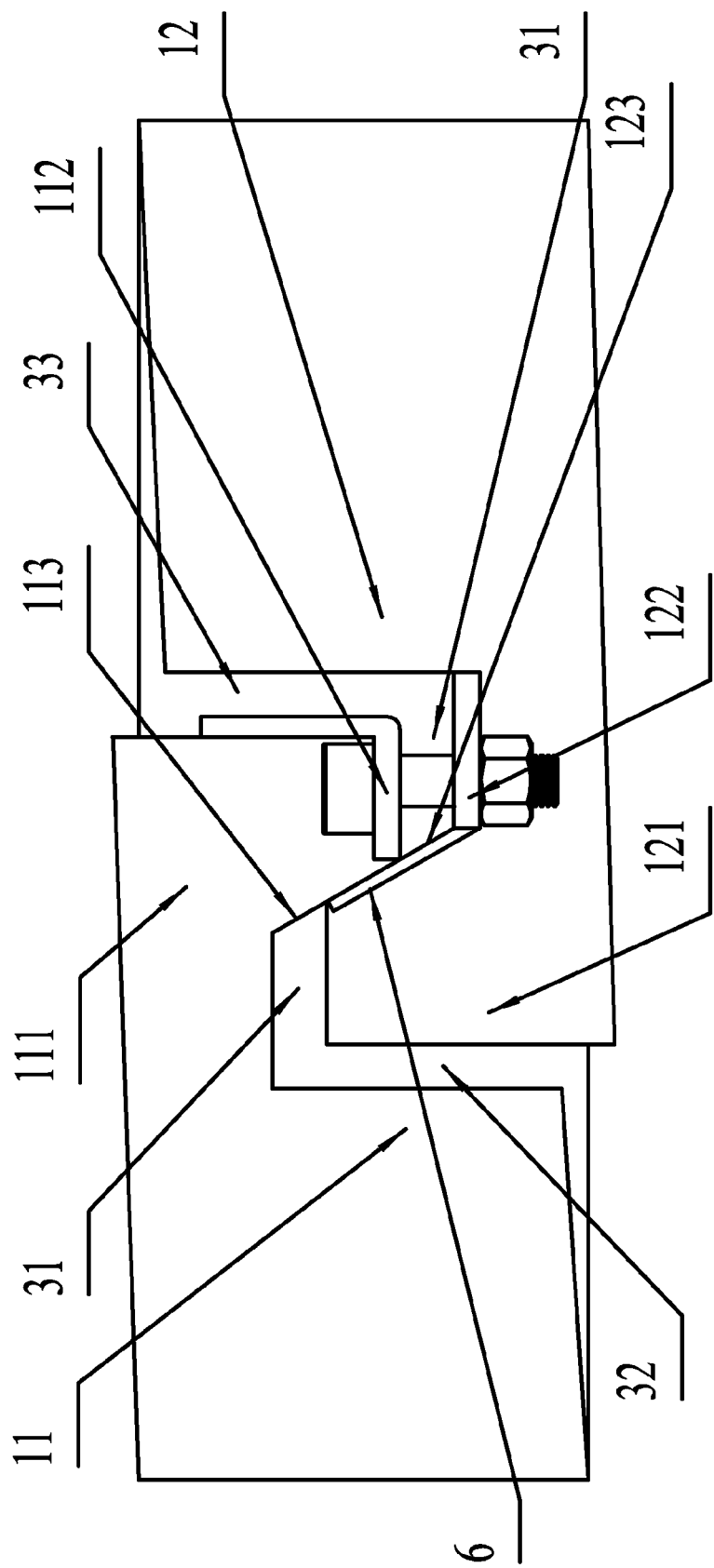
FIG. 8 is a schematic plan view of a locking device of FIG. 7 before installation and locking.
Figure 9:
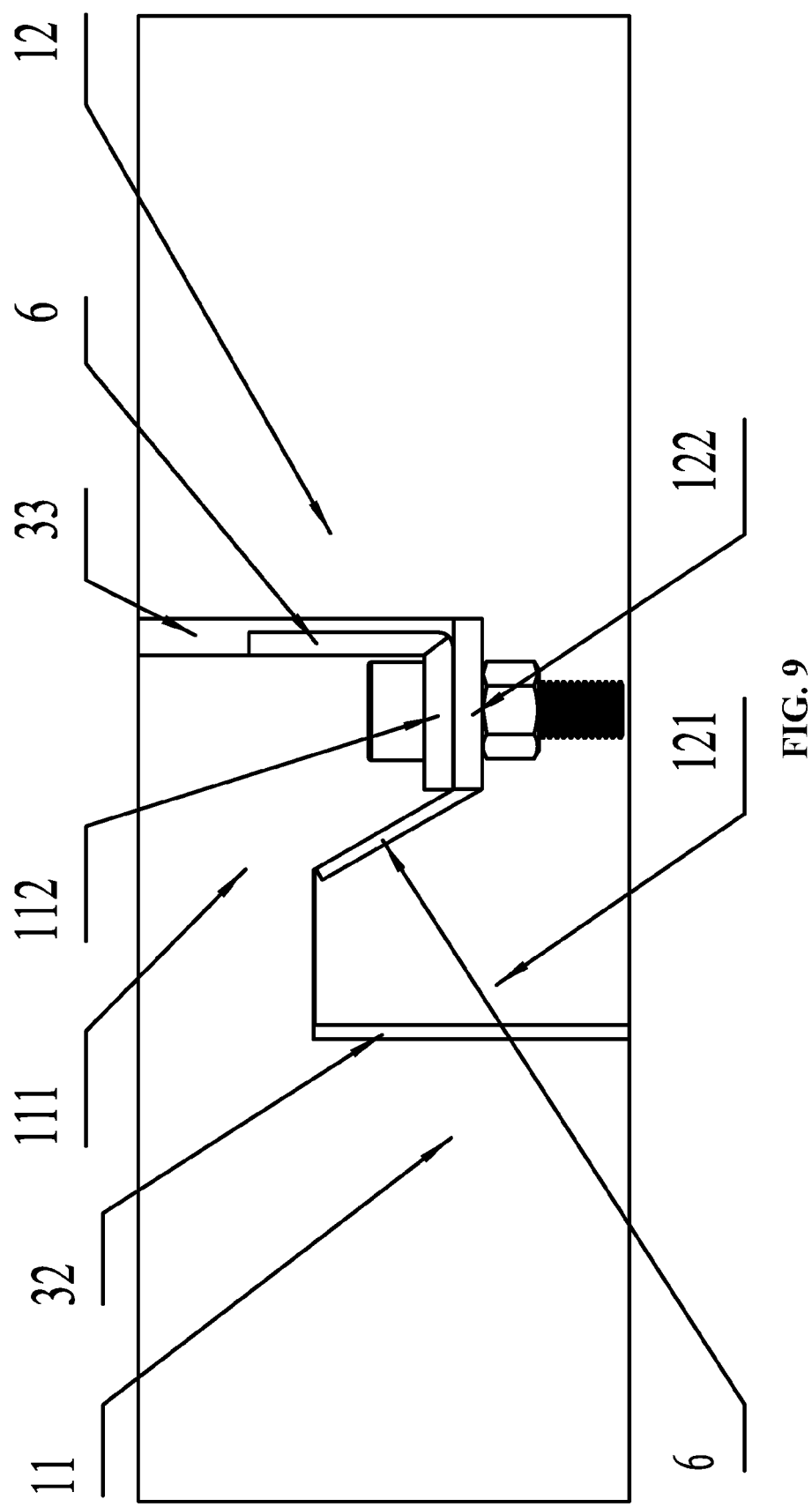
FIG. 9 is a schematic plan view of a locking device of FIG. 7 after installation and locking.
Figure 10:
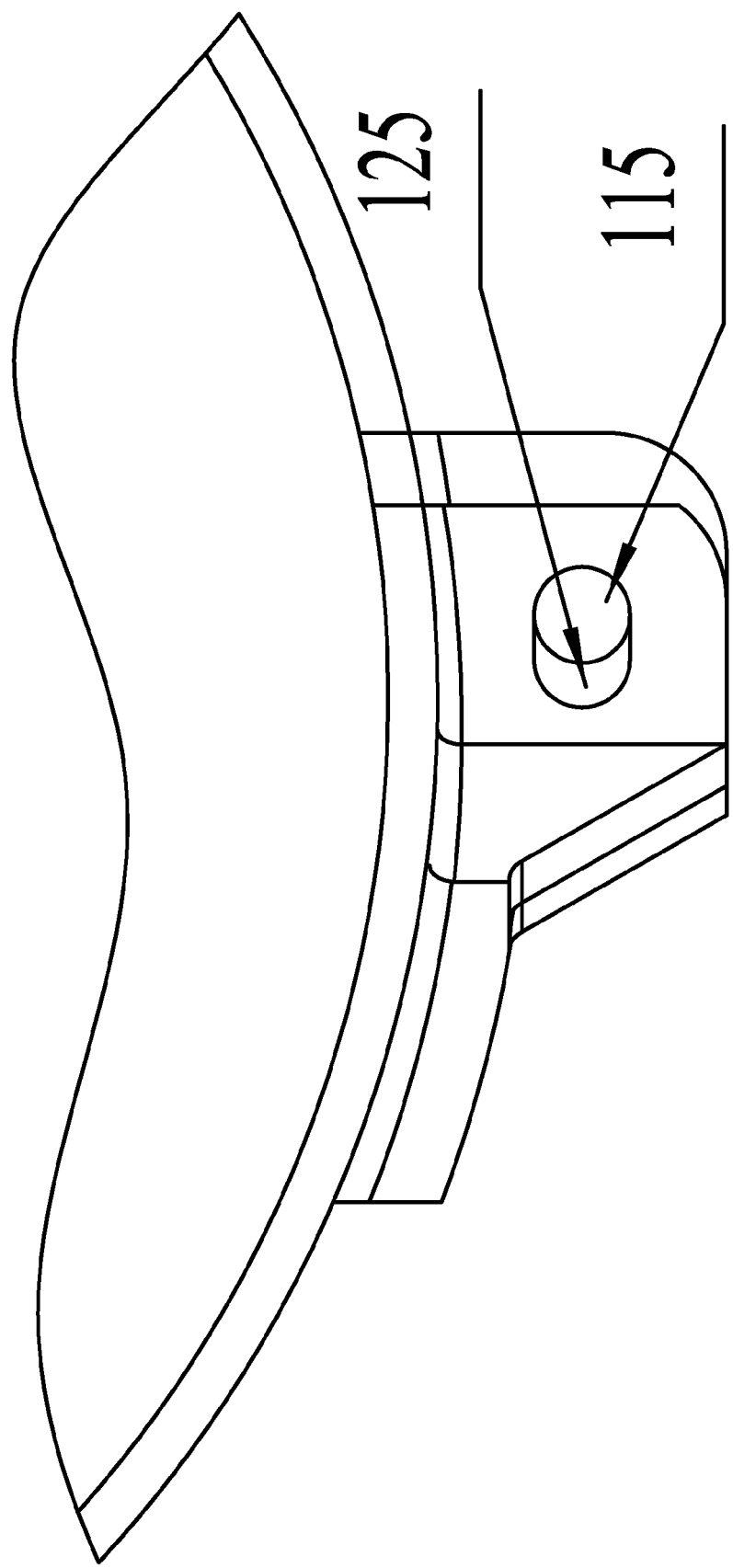
FIG. 10 is a first structural representation of a through hole of an upper convex ear and a mounting hole of a lower convex ear of the locking device according to one embodiment of the invention before installation and locking.
Figure 11:
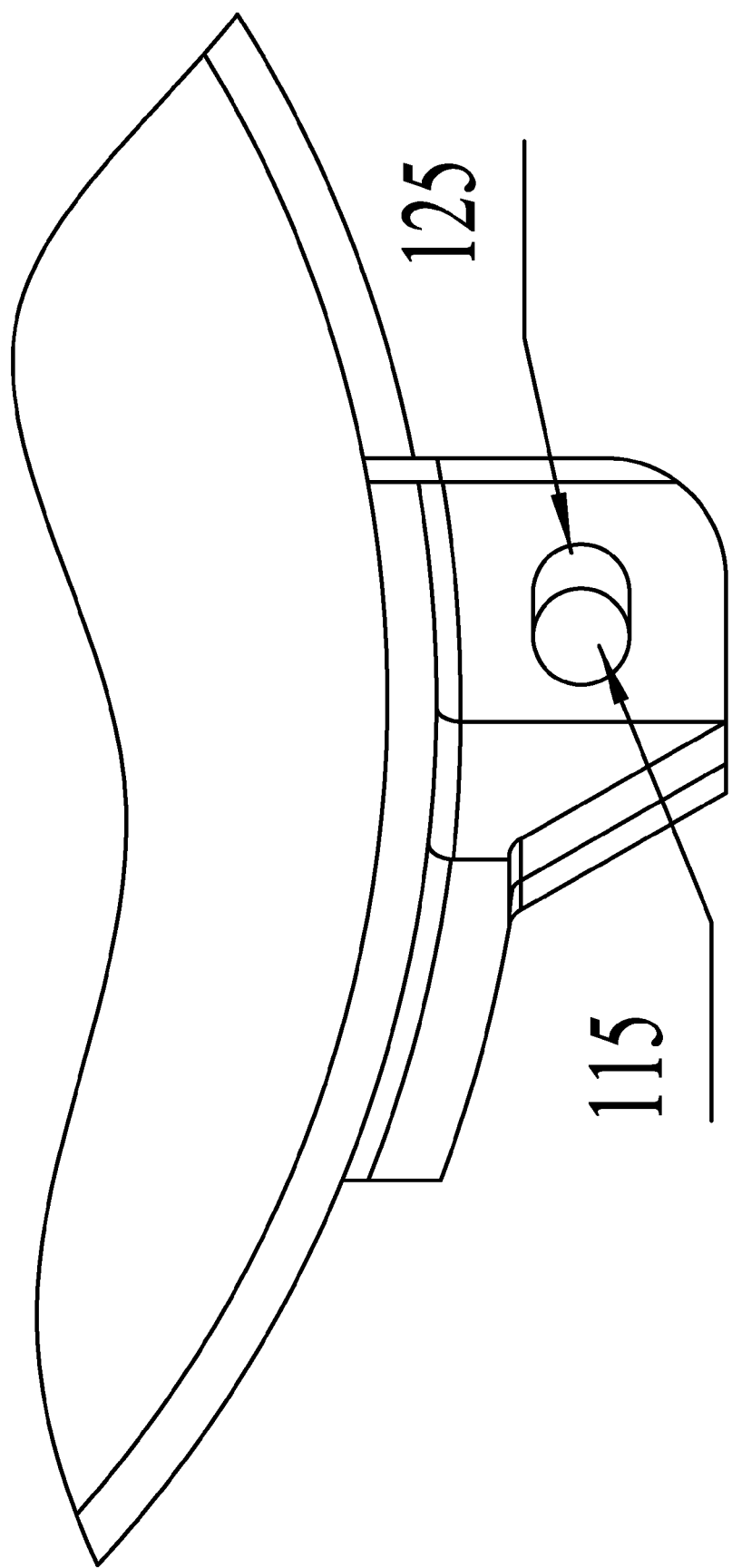
FIG. 11 is a corresponding position diagram of the through hole of the upper convex ear and the mounting hole of the lower convex ear of the locking device of FIG. 10 after installation and locking.
Figure 12:
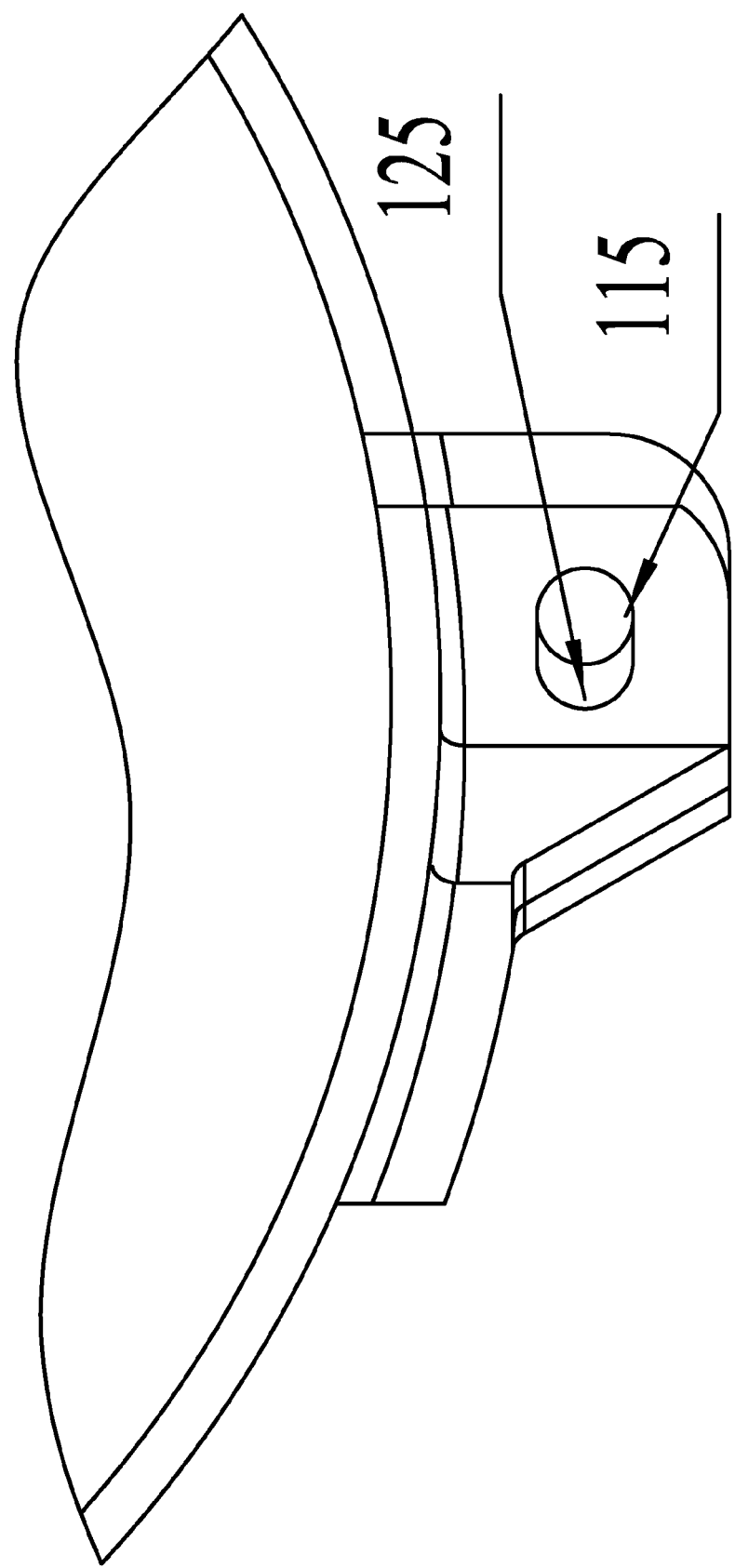
FIG. 12 is a second corresponding structure diagram of the through hole of the upper convex ear and the amounting hole of the lower convex ear of the locking device of the invention before installation and locking.
Figure 13:
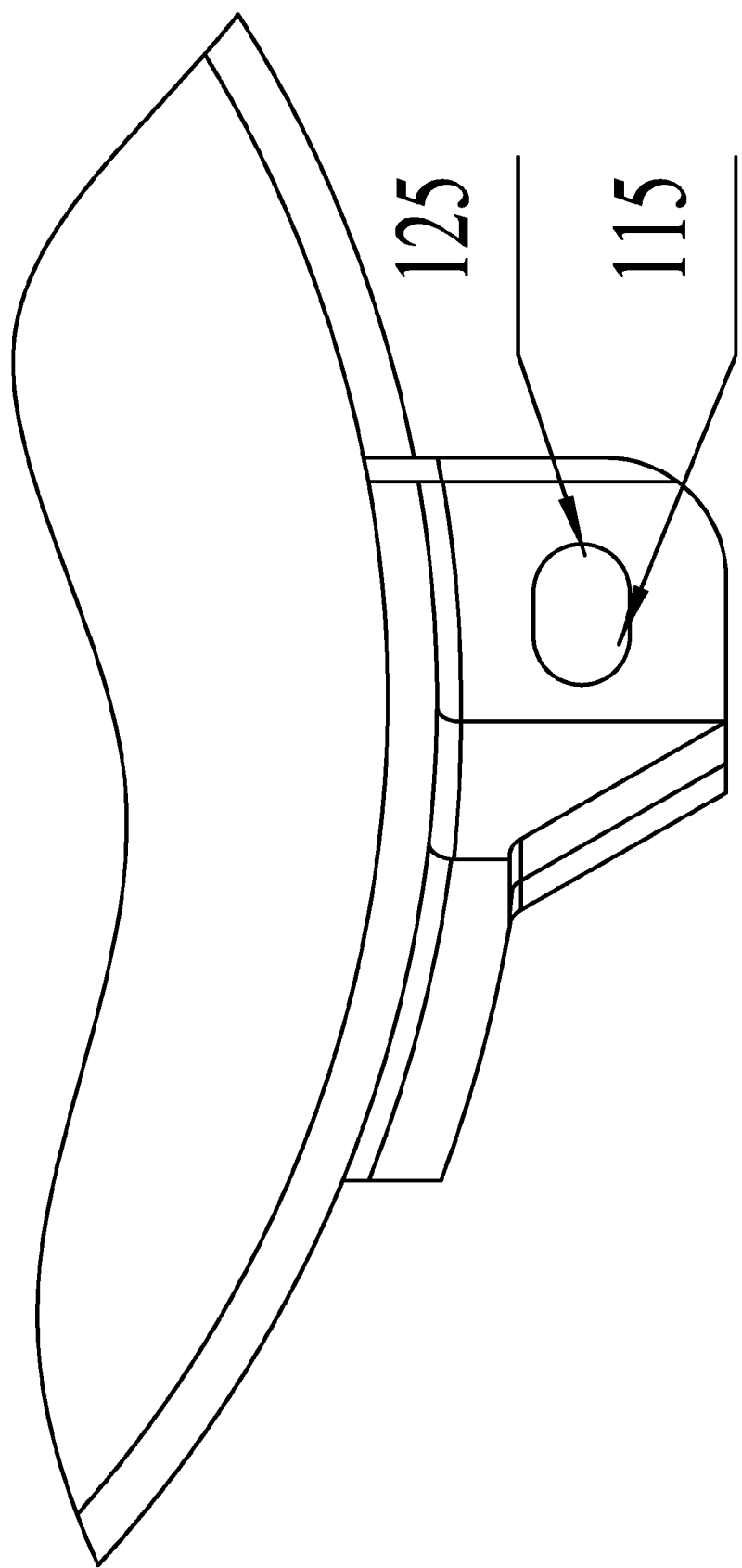
FIG. 13 is a corresponding position diagram of the through hole of the upper convex ear and the amounting hole of the lower convex ear of the locking device of FIG. 12 after installation and locking.

As shown in FIGS. 7-9, a locking device comprises a hoop 1. The hoop 1 curls up to form an axial mounting hole 2 in the middle; an upper convex block 111 protrudes from the left side end 11 of the hoop 1 while a lower convex block 121 protrudes from the right side end 12 of the hoop 1; the upper convex block 111 and the lower convex block 121 are misaligned to form a middle aperture 31; a left aperture 32 is formed between the hoop's left side end 11 and the lower convex block 121 and a right aperture 33 is formed between the hoop's right side end 12 and the upper convex block 111; an upper convex ear 112 protrudes from the outer side of the upper convex block 111 and a lower convex ear 122 protrudes from the outer side of the lower convex block 121; the upper convex ear 112 corresponds to the lower convex ear 122 with respect to their positions; the upper convex block 111 and the lower convex block 121 are respectively arranged with an upper guiding inclined plane 113 and a lower guiding inclined plane 123; as shown in FIGS. 10 and 11 or FIGS. 12 and 13, use a bolt-nut mechanism or screws to axially connect a through hole 115 of the upper convex ear 112 and a mounting hole 125 of the lower convex ear 122 so as to lock the upper convex ear 112 and the lower convex ear 122; the upper convex block 111 and the lower convex block 121 move axially to narrow the middle aperture 31, the upper guiding inclined plane 113 and the lower guiding inclined plane 123 contact with each other to make the upper convex block 111 and the lower convex block 121 to move circumferentially to narrow both the left aperture 32 and the right aperture 33 so as to enable the hoop 1 to tightly hold the object inside the axial mounting hole 2.

The upper guiding inclined plane 113 and the lower guiding inclined plane 123 are directly arranged on the opposite end between the upper convex block 111 and the lower convex block 121, and the upper guiding inclined plane 113 corresponds to the lower guiding inclined plane 123 with respect to their positions; a reinforcing rib 6 is respectively arranged on the side of the upper convex ear 112 and the lower convex ear 122; as shown in FIGS. 10-13, both the through hole 115 of the upper convex ear 112 and the mounting hole 125 of the lower convex ear 122 have a circular or a waist shape.

As shown in FIGS. 14-16, a fan blade 4 is coupled to the outer wall of the hoop 1; the object inside the axial mounting hole 2 is either an external rotor 5 of a motor or a motor shaft 7. Certainly the locking device of the present invention is also applicable to other fields besides motors.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A locking device, comprising an arc-shaped strip, the arc-shaped strip comprising a first end and a second end, wherein:
   the first end comprises an upper convex block and a left side end;
   the second end comprises a lower convex block and a right side end;
   the upper convex block protrudes from the left side end and the lower convex block protrudes from the right side end;
   the upper convex block and the lower convex block are misaligned to form a middle aperture;
   a left aperture is formed between the left side end and the lower convex block, and a right aperture is formed between the right side end and the upper convex block;
   an upper convex ear protrudes from the outer side of the upper convex block and a lower convex ear protrudes from the outer side of the lower convex block;
   the upper convex ear corresponds to the lower convex ear with respect to their positions;
   the upper convex block and the lower convex block are respectively arranged with an upper guiding inclined plane and a lower guiding inclined plane;
   the upper convex ear comprises a through hole, and the lower convex ear comprises a mounting hole;
   the through hole of the upper convex ear and the mounting hole of the lower convex ear are axially connected using a bolt-nut mechanism or screws to lock the upper convex ear and the lower convex ear;
   the upper convex block and the lower convex block move axially to narrow the middle aperture; and
   the upper guiding inclined plane and the lower guiding inclined plane contact with each other to make the upper convex block and the lower convex block to move circumferentially to narrow both the left aperture and the right aperture and enable the first end and the second end to be connected to form a hoop having an axial mounting hole in the middle to tightly hold an object inside the axial mounting hole.

2. The locking device of claim 1, wherein the upper guiding inclined plane and the lower guiding inclined plane are directly arranged on opposite ends of the upper convex block and the lower convex block, respectively.

3. The locking device of claim 2, wherein the upper convex ear is respectively arranged at both ends of the upper guiding inclined plane, the lower convex ear is respectively arranged at both ends of the lower guiding inclined plane, and the upper convex ear corresponds to the lower convex ear with respect to their positions.

4. The locking device of claim 3, wherein both the through hole of the upper convex ear and the mounting hole of the lower convex ear have a circular or a waist shape.

5. The locking device of claim 2, wherein the upper convex ear is arranged at one end of the upper guiding inclined plane, the lower convex ear is arranged at one end of the lower guiding inclined plane, and the upper convex ear corresponds to the lower convex ear with respect to their positions.

6. The locking device of claim 5, wherein both the through hole of the upper convex ear and the mounting hole of the lower convex ear have a circular or a waist shape.

7. The locking device of claim 6, wherein fan blades are connected to the outer wall of the arc-shaped strip.

8. The locking device of claim 7, wherein the object inside the axial mounting hole is either an external rotor of a motor or a motor shaft.

9. The locking device of claim 1, wherein both the through hole of the upper convex ear and the mounting hole of the lower convex ear have a circular or a waist shape.

10. The locking device of claim 9, wherein fan blades are connected to the outer wall of the arc-shaped strip.

11. The locking device of claim 10, wherein the object inside the axial mounting hole is either an external rotor of a motor or a motor shaft.

12. The locking device of claim 2, wherein both the through hole of the upper convex ear and the mounting hole of the lower convex ear have a circular or a waist shape.

13. The locking device of claim 1, wherein the upper guiding inclined plane and the lower guiding inclined plane extend from the upper convex block and the lower convex block to form an upper inclined plate and a lower inclined plate, respectively.

14. The locking device of claim 13, wherein the upper convex ear is respectively arranged at both ends of the upper inclined plate, the lower convex ear is respectively arranged at both ends of the lower inclined plate, and the upper convex ear corresponds to the lower convex ear with respect to their positions.

15. The locking device of claim 14, wherein both the through hole of the upper convex ear and the mounting hole of the lower convex ear have a circular or a waist shape.

16. The locking device of claim 13, wherein the upper convex ear is arranged at one end of the upper inclined plate, the lower convex ear is arranged at one end of the lower inclined plate, and the upper convex ear corresponds to the lower convex ear with respect to their positions.

17. The locking device of claim 16, wherein both the through hole of the upper convex ear and the mounting hole of the lower convex ear have a circular or a waist shape.

18. The locking device of claim 17, wherein fan blades are connected to the outer wall of the arc-shaped strip.

19. The locking device of claim 18, wherein the object inside the axial mounting hole is either an external rotor of a motor or a motor shaft.

20. The locking device of claim 13, wherein both the through hole of the upper convex ear and the mounting hole of the lower convex ear have a circular or a waist shape.

* * * * *